April 9, 1946.  J. H. HUNT  2,398,006

BRAKE SHOE

Filed Feb. 28, 1944

Inventor
John H. Hunt
By Blackmore, Spencer & Flint
Attorneys

Patented Apr. 9, 1946

2,398,006

UNITED STATES PATENT OFFICE 2,398,006

BRAKE SHOE

John H. Hunt, Detroit, Mich., assignor to General Motors Corporation, Detroit, Mich., a corporation of Delaware Application February 28, 1944, Serial No. 524,199

6 Claims. (Cl. 188—250)

To make an improvement in brake shoes is the aim of this invention. Friction lining is usually attached to the metal flanges of brake shoes by rivets. More recently it has been proposed to bond the lining to the metal shoe without rivets. When brass rivets are used these rivets may engage and damage the brake drum surface long before the lining is worn out. When the rivets are omitted the bonded lining may wear much thinner. However, if the lining should become worn through the steel shoe contacts the steel or cast iron drum and the damage is much greater than that resulting from the engagement of the rivets.

The present invention has for its object to prevent that damage by giving warning to the operator that the brake lining needs to be replaced.

While the invention has been referred to as an improvement in brakes it will be readily seen to be useful in a device where the shoe is an element of a clutch.

Figure 1:
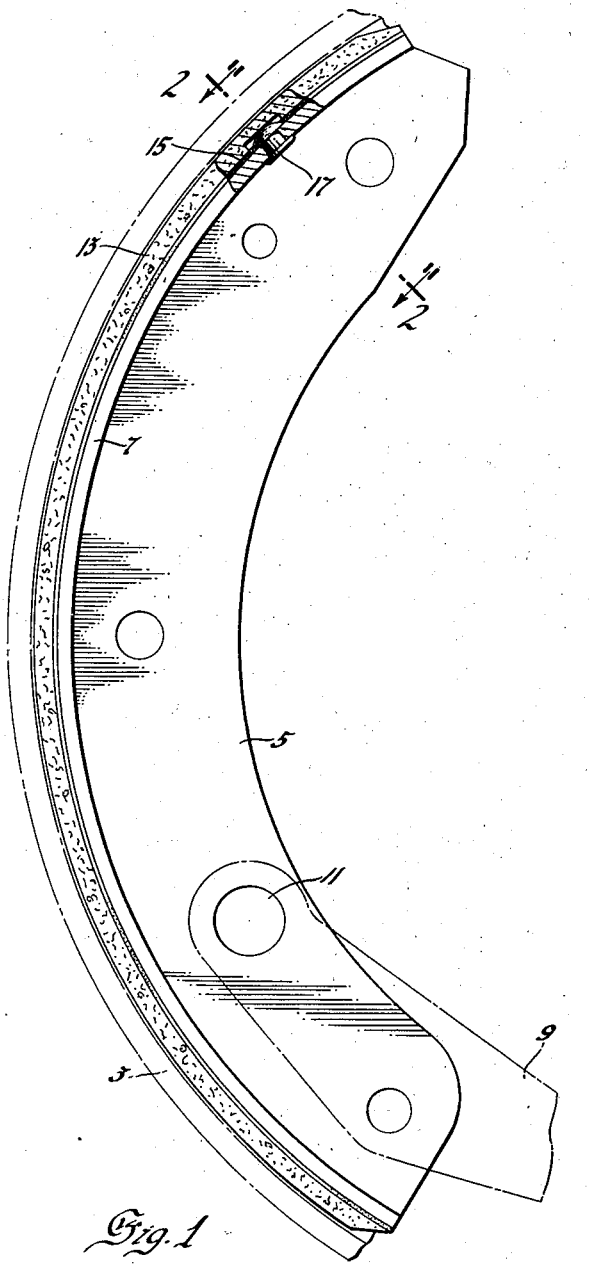

On the accompanying drawing, Fig. 1 is a view in elevation of a brake shoe, the shoe being broken away and sectioned to show my improvement.

Figure 2:
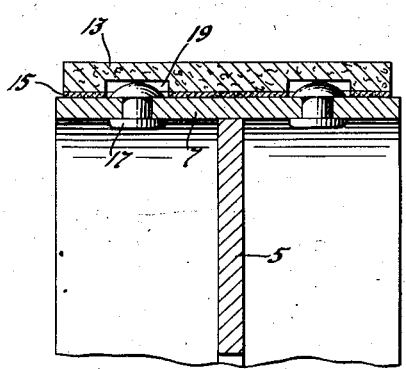

Fig. 2 is a transverse section on line 2—2 of Fig. 1.

A brake drum is marked 3. The brake shoe is made up of a web 5 and a flange 7 as usual. At 9 is an anchoring link pivoted at 11. To the flange 7 is secured a friction lining 13 by the use of some suitable bonding medium indicated at 15. This invention is not concerned with the material by which the lining is secured.

It will be self-evident that, because of the absence of the brass rivets, the lining may wear to a very thin layer before relining becomes necessary. This is a very desirable advantage resulting from bonding the lining instead of riveting. However, if the lining should wear through and if the steel shoe flange should frictionally engage the steel or cast iron drum the damage to the drum will be much greater than the damage from frictional contact of rivets. It is my purpose to give warning to the operator somewhat before the lining gives way and permits the damaging friction to occur.

To accomplish my object I rivet or otherwise secure to the shoe flange one or more metal buttons, the buttons being received within shallow recesses in the side of the lining adjacent the shoe flange. On the drawing, such buttons are identified by numeral 17 and the lining recesses by numeral 19. It will be understood that the lining has its full outer surface for contact with the drum and only when it has been worn to a very thin layer do the buttons contact the drum. The buttons are made from a metal or alloy having a coefficient of friction with iron less than that of the lining. When such buttons contact the drum the frictional resistance of the shoe as a whole is reduced and the operator knows it is time to have the lining replaced. One metal which has been suggested is that known to the trade as Durex, a porous bronze with graphite. Some metals, like lead, which soften and lubricate the drum surface are not quite satisfactory. Their surface in contact with the drum will wear down faster than the lining itself and the frictional resistance of the shoe as a whole will not be appreciably reduced. It is desirable, therefore, to use a metal or alloy having a relatively low coefficient of friction but resistant to disintegration when in frictional contact.

In carrying out the invention care should be exercised in choosing the location for the buttons. As a result of the wrapping or self-energizing action of drum rotation on the shoe there is a progressive increase in pressure between the shoe and the drum from the toe or applied end of the shoe. If the shoe is mounted to have the greatest pressure in the region of the midpoint of its arc the buttons should be located on the toe side of this region. If the buttons were located in this region of greatest pressure the recesses would weaken the lining in that region. When the lining was worn quite thin, being weakened in the region of greatest pressure, it might break through and roll up and lock the shoe. By locating the buttons in advance of this region this will not happen. There will still be a sufficiently good lining at this region of greatest pressure when the buttons become exposed and contact the drum and appreciably reduce the braking efficiency. Also, if the buttons were located in the region of high shoe pressure and should the metal shoe in that region contact the drum, the damage, because of the high pressure, would be much greater than if shoe contact should occur in a region of lesser pressure.

I claim:

1. A brake shoe for frictional engagement with a drum, said shoe having an arcuate metal surface and a lining secured thereto solely by adhesive bonding, said lining having its drum engaging surface uninterrupted by fastening means and having a recess in its surface adjacent said metal surface, a button carried by said metal surface and freely received within said recess, said button having a lesser coefficient of friction with the drum than that of the lining.

2. The invention defined by claim 1, said button being more resistant to frictional wear than the lining.

3. The invention defined by claim 1, said button being formed from Durex.

4. The invention defined by claim 1, said button being located adjacent the toe end of said shoe.

5. The invention defined by claim 1, said recess being shallow so that but a thin layer of lining remains when the buttons contact the drum.

6. A brake shoe having a lining secured thereto solely by adhesive bonding and adapted to frictionally engage a drum, said lining having a recess in its surface adjacent the shoe, means carried solely by said shoe and adapted to freely enter said recess when the lining is assembled on the shoe and operable to engage the drum when the lining is dangerously reduced in thickness and to give warning by a decreased braking resistance.

JOHN H. HUNT.